June 25, 1935.  P. S. BEAR  2,005,985
HOOK FASTENING FOR FISH LURES
Filed Jan. 10, 1934
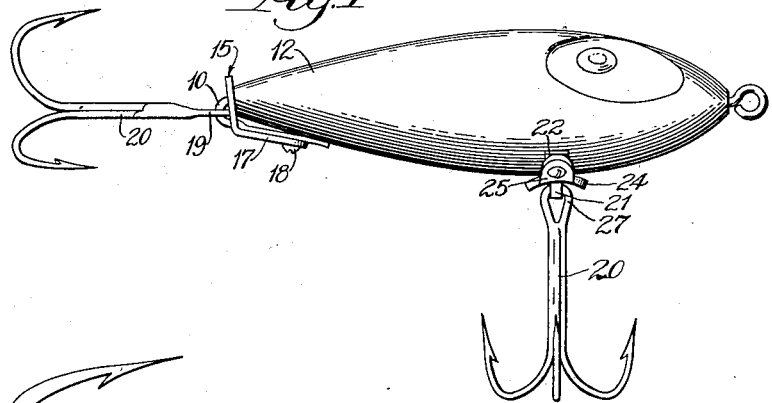
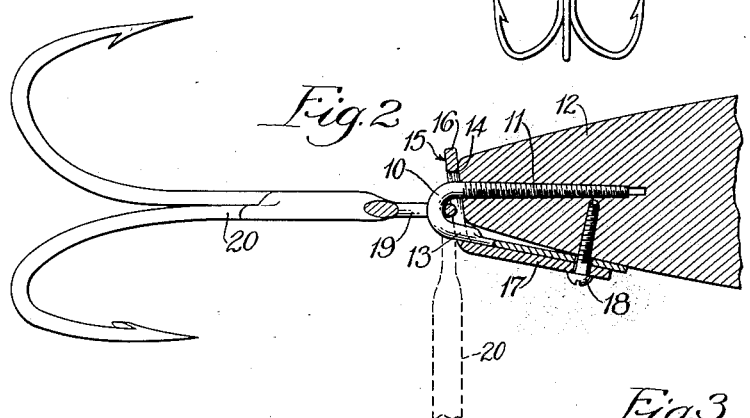
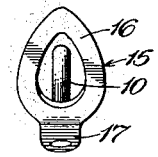
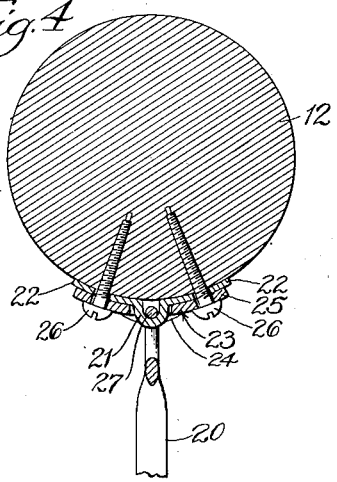
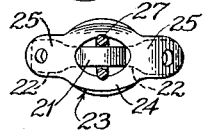
Inventor:
Paul S. Bear,
By Banning & Banning
Attys.

Patented June 25, 1935

2,005,985

UNITED STATES PATENT OFFICE 2,005,985

HOOK FASTENING FOR FISH LURES

Paul S. Bear, Dowagiac, Mich., assignor to James Heddon's Sons, Dowagiac, Mich., a corporation of Michigan Application January 10, 1934, Serial No. 706,001

5 Claims. (Cl. 43—28)

The fastening device of the present invention is designed primarily for use in the attachment of hooks to wooden plug baits in such a way as to afford limited freedom of swinging movement to the hook or gang, without, however, permitting the same to swing into a position where it may become entangled with adjacent hooks or gangs, or with the line, and at the same time the fastening is designed to afford a strong reinforcement against the pulling out or displacement of the member to which the hook or gang is attached.

The device furthermore is designed to permit ready detachability of the hook or gang and to protect and reinforce the bait body at the point of attachment.

Further objects and details of the invention will appear from a description thereof in conjunction with the accompanying drawing, wherein,—

Figure 1 is a side elevation of a plug bait showing the fastening device of the present invention applied to the rear or tail end of the bait, and in modified form to an intermediate portion of the bait body;

Fig. 2 is an enlarged sectional elevation of the rear end of the bait of Fig. 1;

Fig. 3 is a detail of the rear fastening device;

Fig. 4 is a cross sectional elevation of a plug bait showing the attaching device in modified form for attaching a hook or gang to an intermediate portion of the bait body; and Fig. 5 is a detail of the fastening device of Fig. 4.

The fastening device of the present invention, in the form shown in Figures 1, 2 and 3, comprises a tail loop 10, one prong 11 of which is threaded longitudinally into the tail end of a bait body 12, while the companion prong 13 diverges outwardly and abuts against the outer base wall of the bait body in the region of the rear end.

The rear end 14 of the bait body is preferably flattened or truncated to afford a contact surface for a reinforcing member 15 which comprises an upper annular or ring shaped portion 16 and a forwardly extending finger 17. The annular portion surrounds the loop 10, while the finger 17 overlies the prong 13 of the attaching loop, and the parts are held in assembled relation by means of a transverse screw 18 which is entered through the forward ends of the prong 13 and the finger 17 respectively and into the body of the bait.

The loop 10 protrudes through the annular member sufficiently to afford clearance for the eye 19 of a hook or gang 20, and the adjustment of the parts is such as to permit the hook or gang to swing freely throughout the region to the rear of the reinforcing member, which latter, however, affords a stop or abutment on all sides to prevent forward swinging of the hook or gang, which might otherwise permit interference with a forwardly located gang.

By screwing the threaded prong 11 into the bait body to the desired extent, and by properly locating the transverse screw 18, the desired amount of clearance for the swinging of the hook can be provided in all cases, so that the arc of movement of the hook or gang can be limited as desired. At the same time the arrangement is one which increases the strength of the fastening, in that the rearward tension which might tend to draw out the fastening is resisted both by the threaded prong 11 and by the transverse screw 18, and at the same time the reinforcing member serves to limit the hook movements in such a way as to resist the possibility of lateral displacement of the parts and also protects the end of the wooden bait against abrasive action and against marring by contact of the hook points therewith. Furthermore, the fastening device is one which permits of ready detachment of the hook by merely removing the transverse screw, which thereupon permits removal of the reinforcing member and withdrawal of the loop 10 by unscrewing the threaded prong.

Where it is desired to use the attaching device as a connection for a forward hook or gang, the arrangement shown in Figs. 4 and 5 is employed. In this case, a loop 21 is employed, which is provided with laterally extending prongs 22—22 which circumferentially embrace the bait body. The reinforcing body 23 comprises an annular or ring shaped portion 24 similar in character to the annular or ring shaped portion 16 previously described, and the annular portion 24 is provided with attaching fingers 25—25 which overlie the prongs 22—22, the parts being held in assembled position by means of a pair of transversely extending inwardly converging screws 26. The eye 27 of the forward gang or hook engages the loop 21, and the swinging movements of the forward gang are thus restrained or restricted in the manner heretofore described.

The functions and advantages of the construction shown in Figs. 4 and 5 are similar to those previously described, and displacement of the fastening is resisted by the screws 26 which extend at angles to the line of pull on the hook. The front and rear gangs are preferably spaced from one another sufficiently to prevent excessive swinging which might cause entanglement of the gangs, although the present invention is designed to permit the use of the attaching devices previously described, either singly or in combination with one another.

The formation of the reinforcing member is such that it not only limits the movements or the hook or gang, but also furnishes a surrounding reinforcement for the loop 10 or 21, as the case may be, and thereby reinforces the loop against spreading or opening when subjected to strain, and otherwise strengthens and protects the fastening.

Although the invention has been described with particularity as to detail, it is not the intention, unless otherwise indicated, to limit the device to the precise details shown, since modifications thereof may be made without departing from the spirit of the invention; nor is it the intention to limit its use to wooden plug baits, since it may be otherwise employed.

I claim:

1. In combination with a bait body, a loop extending outwardly therefrom and terminating in prongs engaging the bait body, at least one of said prongs abutting against the outer surface of the bait body, a hook provided with an eye engaging said loop and adapted to swing thereon, a reinforcing member provided with an annular portion surrounding said loop and positioned to limit the swinging of said hook and an attaching portion overlying the exposed prong of said loop, and a securing member entered through said attaching portion and through said exposed prong and extending into the body of the bait at an angle to the normal line of pull of said hook.

2. In combination with a bait body, a loop extending outwardly therefrom and terminating in diverging prongs, one of said prongs being threaded into the bait body and the other prong lying exteriorly against the surface of the bait body, a hook provided with an eye entered through said loop, a reinforcing member comprising an annular portion through which said loop protrudes and positioned to restrict the swinging movements of said hook and an attaching portion overlying the exposed prong of said loop, and means entered into the bait body for securing said attaching portion and said exposed prong to the bait body.

3. In combination with a bait body, a loop extending rearwardly therefrom and terminating in diverging prongs, one of said prongs being threaded into the bait body and the other prong lying exteriorly against the side surface of the bait body, a hook provided with an eye entered through said loop, a reinforcing member comprising an annular portion surrounding said loop and bearing against the rear end of the bait body and positioned to restrict the swinging movements of said hook and an attaching portion overlying the exposed prong of said loop, and a transversely extending screw entered through said attaching member and said exposed prong and into the bait body at an angle to the threaded prong of the loop.

4. In combination with a bait body, a loop extending rearwardly from the rear end of the bait body and comprising a threaded prong entered longitudinally into the bait body from the rear end thereof and an attaching prong lying externally against the side surface of the rear portion of the bait body, a hook provided with an eye engaging said loop, a reinforcing member comprising an annular portion surrounding said loop and bearing against the rear end of the bait body and limiting the swinging movements of said hook and an attaching portion extending forwardly and overlying the exposed prong, and a screw entered through said attaching portion and through said exposed prong and into the bait body at an angle to the threaded prong of said loop.

5. In combination with a bait body, an attaching member comprising a loop having two oppositely extending attaching prongs abutting against the surface of the bait body, a hook having an eye engaging said loop, a reinforcing member comprising an annular portion through which said loop protrudes and serving to limit the swing of said hook, attaching fingers overlying the prongs of said loop, and a screw entered through each of said fingers and through the underlying prong and into the bait body, said screws converging toward one another and extending substantially transversely to the longitudinal axis of the bait body.

PAUL S. BEAR.